June 9, 1936.  J. MIHALYI  2,043,901

PHOTOGRAPHIC APPARATUS

Filed Aug. 18, 1934    3 Sheets-Sheet 1

Inventor:
Joseph Mihalyi,

By Newton A. Virrus
Rolla X. Carter
Attorneys

June 9, 1936.  J. MIHALYI  2,043,901
PHOTOGRAPHIC APPARATUS
Filed Aug. 18, 1934   3 Sheets-Sheet 2

Inventor:
Joseph Mihalyi,
By Newton M Perrin
Rolla N. Carter
Attorneys

June 9, 1936. J. MIHALYI 2,043,901
PHOTOGRAPHIC APPARATUS
Filed Aug. 18, 1934 3 Sheets-Sheet 3

Inventor:
Joseph Mihalyi,
By
Attorneys

Patented June 9, 1936

2,043,901

UNITED STATES PATENT OFFICE 2,043,901

PHOTOGRAPHIC APPARATUS

Joseph Mihalyi, Rochester, N. Y., assignor to Eastman Kodak Company, Rochester, N. Y., a corporation of New York Application August 18, 1934, Serial No. 740,469

6 Claims. (Cl. 88—16)

My present invention relates to photographic apparatus and more particularly to motion picture cameras provided with light meter controlled diaphragm adjusting means of the type described and claimed in my copending application Serial No. 715,284 filed March 13, 1934.

In the apparatus described in the above application, when the camera is pointed towards a scene to be photographed, a light sensitive cell activated by light reflected by the scene controls the deflections of a meter pointer. Movement of the camera release lever to make an exposure initially adjusts the camera diaphragm to an opening determined by the position of the deflected meter pointer and then releases the camera mechanism to make an exposure through the properly adjusted diaphragm. This arrangement will insure correct exposure for any given shutter speed and emulsion speed of the film used but when films of different characteristics are to be used with any one of a number of different shutter speeds, it is highly desirable to provide the diaphragm adjusting mechanism with means for accommodating it to these various factors.

It is an object of my invention to provide a differential control for a light meter-controlled diaphragm adjusting means whereby the film and shutter speeds enter into the final setting for the diaphragm.

Another object of my invention is to provide in a magazine camera an arrangement whereby insertion of a magazine will adjust the diaphragm setting mechanism in accordance with the speed of the film carried by the magazine.

A further object of my invention is to provide a motion picture film magazine with a deformation corresponding to the speed of the film carried thereby, whereby when it is inserted in a camera provided with my diaphragm control mechanism it will automatically adjust the mechanism the correct amount.

A further object of my invention is to provide a coupling between the shutter speed control lever and an element of the diaphragm control mechanism for adjusting the constants of said mechanism in accordance with the shutter speed.

Other objects and advantages of my invention will become apparent from the following description when read in connection with the accompanying drawings in which.

Figure 1:
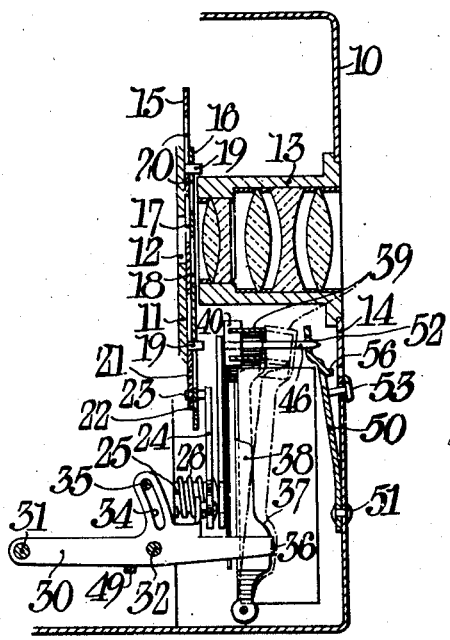
Fig. 1 is a side elevation in section showing the manually operated lever differential as applied to a motion picture camera.
Figure 2:
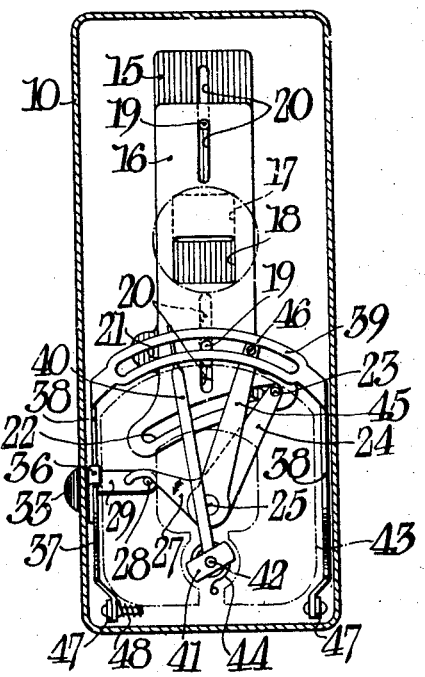
Fig. 2 is a front elevation of the mechanism shown in Fig. 1 with the front wall of the camera removed.

Referring to the drawings, I have shown in Figs. 1 and 2 one form of my invention as applied to a motion picture camera 10 provided with a light sensitive cell controlled diaphragm adjusting mechanism of the type described in my above identified copending application. In the present form, an interior wall 11 of the camera 10 is provided with an exposure window 12 behind which a film is adapted to be held in any well known manner in the focal plane of an objective 13 carried by the front wall 14 of the casing of the camera 10. Diaphragm blades 15 and 16 with their overlapping apertures 17 and 18 are supported for relative vertical adjustment on pins 19 secured to the wall 11 and extending through slots 20 in the blades 15 and 16.

The lower ends of the blades 15 and 16 are provided with cammed slots 21 and 22, respectively, through which extends a pin 23 carried by a diaphragm adjusting lever 24 which is pivoted on a stud 25 secured to any suitable part of the camera frame, and biased by spring 26 in a counter-clockwise direction as indicated by the arrow in Fig. 2. The lever 23 forms one arm of a bell crank, the other arm 27 of which is resiliently held by the spring 26 in engagement with a pin 28 carried by an upturned ear 29 formed integrally with a lever 30 pivoted at 31.

The lever 30 has a pin 32 extending through the camera casing and provided with a button 33 by means of which the lever 30 may be rotated about its pivot 31. As shown in Fig. 1, the lever 30 has an arcuate slot 34 cooperating with a pin 35 for limiting its angular movement.

The free end 36 of the lever 30 is bent over to engage a cam surface 37 formed on one of the arms 38 which carry an entrapping means 39 for a pointer 40 of an electric meter consisting of a coil 41 mounted on a shaft 42 suitably supported between the poles of a magnet 43 shown in outline in Fig. 2. The meter shaft 42 is biased in a well known manner by a spiral spring 44 to return the pointer 40 to the extreme of its clockwise movement as viewed in Fig. 2.

A stop arm 45 is mounted on the stud 25 and frictionally clutched to the diaphragm operating lever 24 so that it may be angularly adjusted relative to the lever 24. The stop arm 45 is provided with a stop pin 46 which extends through the needle entrapping means 39 so that it will engage with the needle pointer 40 to stop the actuation of the diaphragm blades, as is fully described in the above identified application. The supporting arms 38 of the entrapping means 39 are pivoted to brackets 47 carried by the camera casing and at least one of the pivots 47 is provided with a spring 48 for biasing the entrapping means 39 out of pointer entrapping position as shown in broken lines in Fig. 1.

The operation of the diaphragm adjusting arrangement just described is as follows: assuming that the camera has been pointed toward a scene to be photographed and that the light-sensitive cell (not shown) has caused a deflection of the meter pointer 40 to a position corresponding to the intensity of the light coming from the scene, the operating button 33 is moved from the position shown in Fig. 2 to the position shown in Fig. 1 during the first part of which movement the bent over end 36 of the lever 30 rides downward on the cam surface 37 of the arm 38 to force the entrapping means 39 into pointer entrapping position as shown in Fig. 1, and against the biasing force of the spring 48. During this movement of the lever 30 the upturned ear 29 and the pin 28 carried thereby have permitted the spring 26 to rotate the diaphragm adjusting lever 24 and the stop arm 45 in a counter-clockwise direction as viewed in Fig. 2. This movement adjusts the diaphragm blades 15 and 16 as above described until halted by the engagement of the stop pin 46 with pointer 40 which has been entrapped in its deflected position by the entrapping means 39, and accordingly the opening of the diaphragm is the proper one for the prevailing light conditions.

Figure 3:
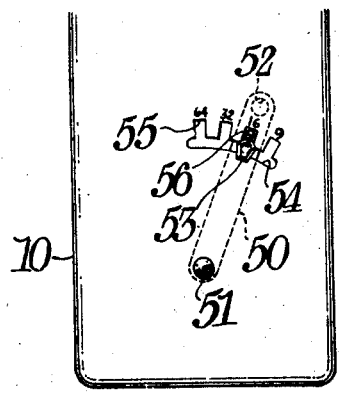
Fig. 3 is a front elevation of a portion of the front camera wall.

The latter part of the downward movement of the lever 30 engages with and depresses the camera release 49 but does not affect the diaphragm adjusting means, due to the fact that the engagement of the stop pin 46 with the pointer 40 has prevented the arm 27 from continuing to follow the pin 28 and the bent over end 36 of the lever 30 rides on a straight line portion of the cam 37. Thus, it will be seen that for any given light intensity the diaphragm will be adjusted to a predetermined opening, which will be the proper one for a given camera speed and a given emulsion. It is frequently desirable to operate the camera at different speeds and with emulsions which differ greatly in sensitivity and, in order to regulate the diaphragm adjusting means to take care of such variable features, I have provided an index lever 50 pivoted at one end to the front wall 14 of the camera by means of a ratchet 51, and having its other end provided with an aperture 52 and extending into a position for cooperation with the stop pin 46, in a manner now to be described. As shown in Figs. 1 and 3 the index lever 50 comprises a flat spring, the force of which normally holds the lever 50 out of the path of the stop pin 46 and is provided with a headed pin 53 which extends through an arcuate slot 54 in the front wall 14. One edge of the slot 54 is provided with notches 55 which are adapted to receive a turned-up ear 56 formed integrally with the index lever 50. The notches 55 may be calibrated in terms of the camera speed or the speed of the emulsion to be used or a combination of the two, and when it is desired to regulate the characteristics of the diaphragm adjusting mechanism, pressure is applied to the headed pin 53 to force the apertured end of the lever 50 over the stop pin 46 as shown in Fig. 1, after which the index lever 50 is rotated until it coincides with the notch 55 corresponding to the camera speed, the film speed, or both, at which time it is released and the spring action of the lever 50 removes it from engagement with the stop pin 46 and forces the index ear 56 into the notch 55 selected.

The operation just described varies the angular relation between the stop arm 45 and the diaphragm adjusting lever 24 to which it is frictionally clutched. It will be obvious that a variation in this angular relation will correspondingly affect the opening to which the diaphragm will be adjusted for any given position of the meter pointer 40. This will be evident if for example, it is assumed that the index lever 50 was moved from the position marked 16 in Fig. 3 to the position marked 32 which movement increased the angle between the stop arm 45 and the diaphragm adjusting arm 24 so that now, as the camera is operated by depressing the button 33, the diaphragm adjusting arm 24 will have moved through a smaller angle when the stop pin 46 engages the pointer 40, and therefore, the diaphragm will be adjusted to a correspondingly smaller opening.

Figure 4:
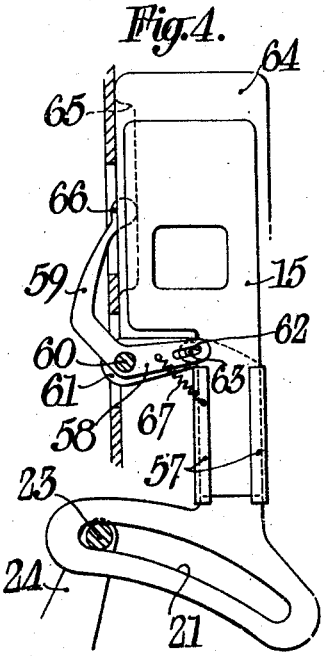
Fig. 4 is a detail of one of the diaphragm blades providing means for adjusting its effective length.

Although it is possible to calibrate notches 55 of the index lever 50 in terms of both the camera speed and the emulsion speed it is more practical to use the index lever only for adjusting the mechanism in accordance with the camera speed and to introduce separately the adjustment for the emulsion speed, or vice versa. One suitable arrangement for making this adjustment automatically in a magazine camera is shown in Fig. 4, in which one of the diaphragm blades 15 is connected to its operating cam slot 21 by a sliding connection whereby the effective length of the diaphragm blade 15 may be altered. Any suitable means for doing this may be used, and is shown in Fig. 4, as comprising a channel formed by turning over the two edges 57 of the part provided with the cam slot 21. Into this channel is inserted the lower end of the blade 15 and relative adjustment of the blade in the channel is obtained by means of a bell crank comprising arms 58 and 59 pivoted on a pin 60 carried by an ear 61 forming an extension to the part of the blade provided with the cam slot 21.

The free end of the arm 58 is provided with a radial slot 62 through which extends a pin 63 carried by the diaphragm blade 15. With this arrangement, angular movement of the arm 58 about its pivot 60 varies the distance between the blade 15 and the cam slot 21 and the extent of this adjustment may be controlled in accordance with the emulsion speed of a film contained in a magazine 64 by providing the magazine with an indentation 65 having a depth corresponding to the emulsion speed. The indentation 65 is so positioned on the magazine 64 that when it is inserted in the camera it forces out the rounded end 66 of the bell crank arm 59 which may be biased to engage with the indentation 65 in any suitable manner, as by a spring 67. It will be evident that when the magazine 64 is inserted as shown in Fig. 4, the effective length of the diaphragm blade 15 will be a function of the depth of the indentation 65 and therefore a function of the emulsion speed of the film contained in the magazine. With this arrangement, when the camera of Figs. 1 and 2 is operated, the opening to which the diaphragm is adjusted will not only depend upon the position of the pointer 40 but upon the effective length of the diaphragm blades 15 and will therefore be automatically compensated to correspond to the particular emulsion speed of the film to be exposed.

It will, of course, be understood that the predetermined embossing or indentation in the film magazine may be provided at any suitable point on the magazine surface where it is most convenient to provide the arm 59 for adjusting the effective length of the diaphragm blade 15.

Figure 5:
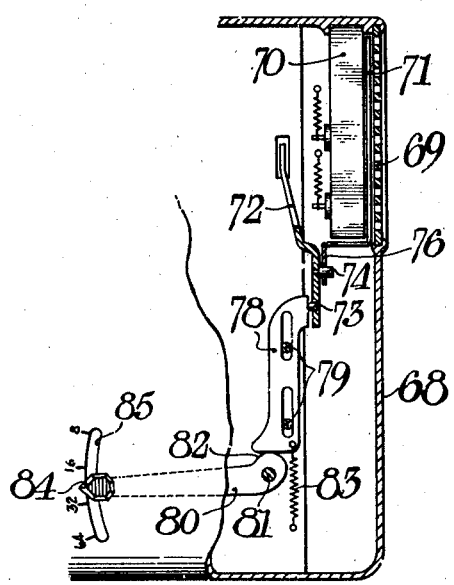
Figs. 5 and 6 are sectional side and front views, respectively, of an arrangement for adjusting the sensitivity of the light sensitive cell in accordance with the film and shutter speeds.
Figure 6:
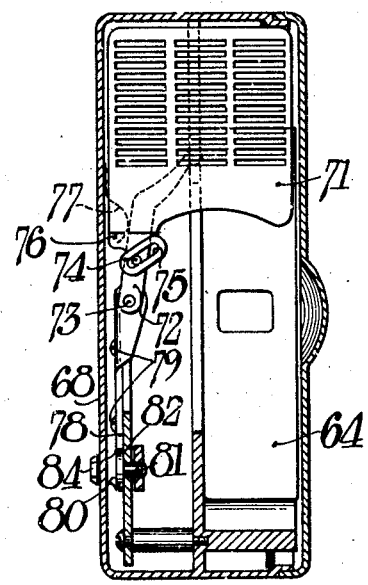

The film magazine having a predetermined embossing or indentation varying in depth or height in accordance with the emulsion speed of the film contained in the magazine may be used to coordinate automatically the diaphragm adjusting mechanism with the particular magazine inserted into the camera, in other ways than the one just described, as, for instance, by employing the magazine to vary the sensitivity of the light sensitive cell utilized for deflecting the needle pointer 40. One suitable arrangement for altering the sensitivity of the light-measuring system is shown in Figs. 5 and 6 in which a camera 68, provided with a grid 69 for limiting the angle of incidence of the light falling on the light sensitive cell 70 positioned behind the grid 69. Between the grid 69 and the cell 70 is positioned a grid shutter 71 which may be adjusted to alter the effective working area of the cell 70 and correspondingly change the energy supplied to the meter element and therefore alter the diaphragm adjusting mechanism in accordance with the adjustment of the grid shutter 71. Any suitable arrangement may be used for altering the adjustment of the shutter 71 in accordance with the emulsion speed of the film contained in the magazine 64 and in the embodiment illustrated in Figs. 5 and 6 is shown as comprising an arm 72 pivoted at one end on a pin 73 and having its free end extending into engaging position with the indentation or embossing provided on the magazine 64. The arm 72 intermediate its free end and its pivot carries a pin 74 which extends through an angular slot 75 formed in an ear 76 depending from the grid shutter 71. Angular movement of the arm 72 will impart vertical movement to the shutter 71 and its angular position as determined by the embossing or indentation upon the magazine 64 will determine the relative position of the shutter 71 and the grid 69, and, accordingly, the proportion of the light incident on the grid 69 which is permitted to fall upon the cell 70.

It will be understood that suitable guideways will be provided to insure accurate and easy movement of the grid shutter 71 and the arm 72 may be resiliently pressed into engagement with the magazine embossing by a spring 77. The arrangement just described functions as follows: when the magazine 64 is inserted in the camera the arm 72 will assume a position determined by the depth of the embossing on the magazine 64 and the grid shutter 71 and automatically alter the effectiveness of the cell 70, whereby the deflection of the needle pointer 40 will be such as to furnish the proper diaphragm opening required for the film contained in the magazine.

Figure 8:
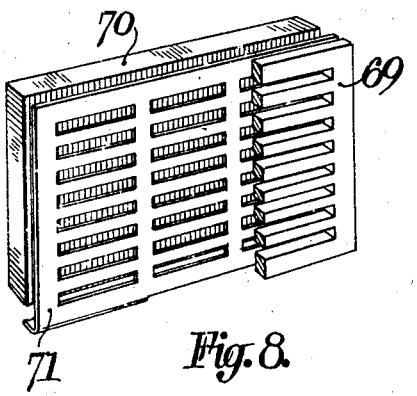
Fig. 8 is a perspective view partly in section showing one suitable arrangement for adjustably screening the light sensitive cell.

Reference to Fig. 8 will make apparent the relation between the grid 69 and cell 70 and the grid shutter 71 and its operation will be obvious from this relation.

If it is desired only to utilize the adjustment of the effective working area of the cell 70 for introducing compensation for the film speed, then the pivot 73 of the arm 72 may be fixed by securing it to any suitable part of the camera structure. In the embodiment shown in Figs. 5 and 6, the adjustment of the grid shutter 71 is also employed to introduce into the diaphragm adjusting system a compensation corresponding to the speed at which the camera is to be operated. This adjustment may be accomplished by mounting the pivot 73 on a member 78 provided with slots through which extend pins 79 which permit vertical movement of the member 78. The camera change speed lever 80 pivoted at 81, is provided with a cam-shaped portion 82 against which the lower end of the member 78 is held by the tension of a spring 83.

The free end 84 of the change speed lever 80 projects through an arcuate slot 85 to the outside of the camera where it cooperates with a suitable scale to indicate the speed at which the camera mechanism is set to operate. The mechanism by which the lever 80 adjusts the speed of the camera drive may be of any well known structure and is not here shown.

Adjustment of the lever 80 for different camera speeds operates through its cam-shaped portion 82 to adjust in a vertical direction the pin 73 upon which the arm 72 is pivoted and, accordingly, shifts the light unit to alter the relation between the shutter 71 and the grid 69. The shape of the cam 82 will be predetermined to introduce a factor so that the changed sensitivity of the cell 70 will be such that its output which controls the deflection of the needle pointer 40 will be altered to the extent made necessary by the change in the speed of the camera and therefore the exposure time.

Figure 7:
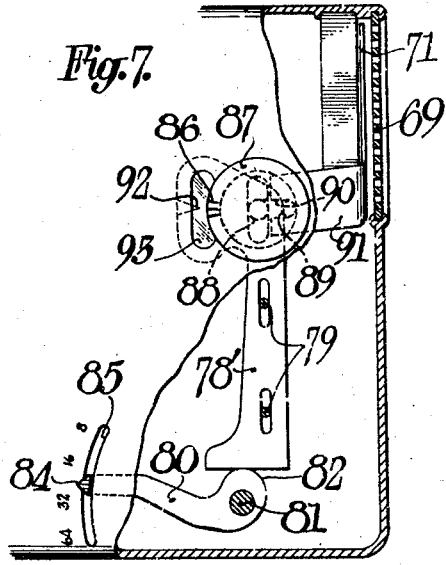
Fig. 7 is a side elevation partly in section of a modification of the arrangement shown in Figs. 5 and 6.

A modification of the arrangement shown in Figs. 5 and 6 is illustrated in Fig. 7. In this modification the adjustment of the grid shutter 71 is automatically controlled by the change speed lever and manually controlled in accordance with the emulsion speed of the film as indicated by suitable index marks 86 which correspond to the several standard emulsion speeds available on the market and which may be individually labeled as desired. The manual adjustment of the grid shutter 71 is accomplished by means of a dial 87 rotatable about an axis 88 and provided with an eccentric pin 89 which engages a slot 90 provided in an extension 91 of the grid shutter 81. The vertical carriage 78¹ is provided with an index member 92 which is visible through a window 93 provided in the camera wall and the grid shutter 71 will be adjusted for the film speed when the dial 87 is rotated until the engraved line 86 corresponding to the speed of the film being used lies opposite the index mark 92.

This manual adjustment of the dial 87 corresponds to the adjustment introduced by the magazine embossing in the arrangement shown in Figs. 5 and 6, and the adjustment of the shutter 71 in accordance with the camera speed is accomplished by means of the movement of the change speed lever 80 and the vertically movable member 78¹ in the same manner as described in connection with Figs. 5 and 6. Thus it will be seen that adjustment of the change speed lever 80 will cause the carriage 78¹ to shift the entire unit up or down and alter the setting of the shutter 81 for proper exposure with the speed to which the camera has been set.

Figure 9:
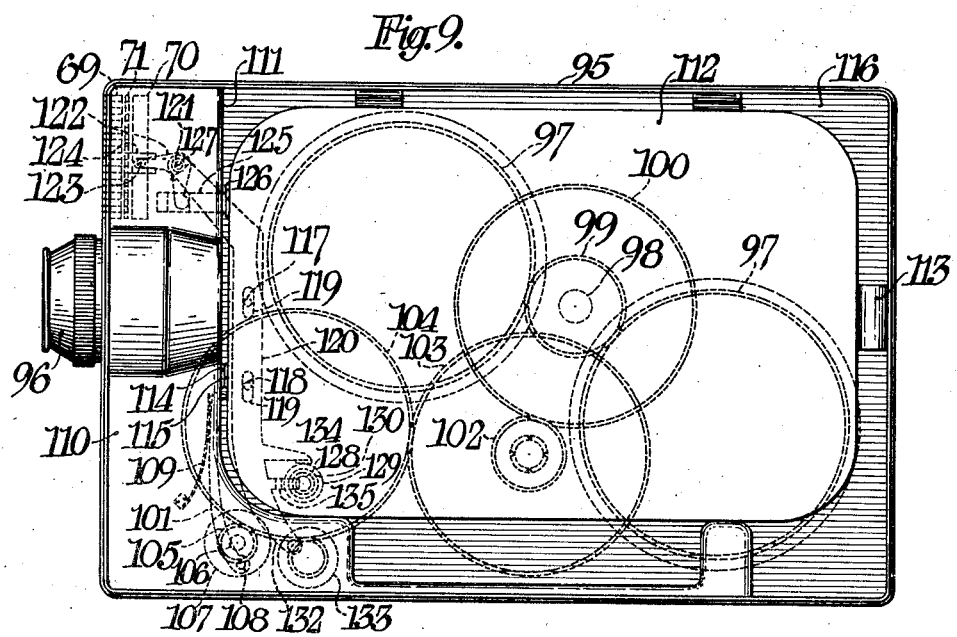
Fig. 9 is a side elevation of a magazine camera with the cover plate removed.
Figure 10:
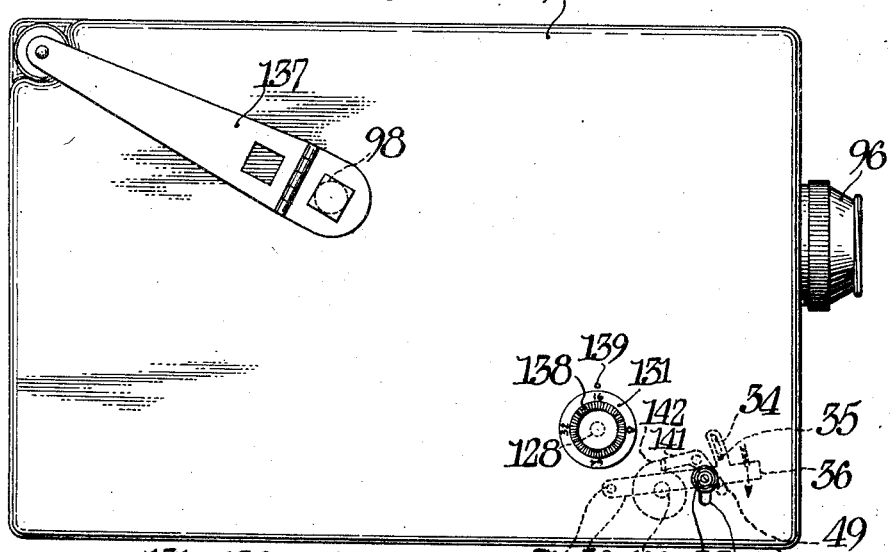
Fig. 10 is a side elevation of the reverse side of the camera shown in Fig. 9.

Certain features of a complete magazine type of camera constructed in accordance with my invention is illustrated in Figs. 9 and 10. Referring first to Fig. 9, the camera 95 is shown with its cover plate removed and having the usual objective mount 96. The camera drive mechanism, indicated in outline, includes two spring motors 97 which drive a shaft 98 through a gear 99. The shaft 98 carries a gear 100 which drives any well known pull down claw 101 through gears 102, 103, 104, and 105, a shaft 106 and a disc 107 to which the claw 101 is pivoted at 108. A flat spring 109 may be provided for suitably biasing the claw 101 into film engaging position as is well known.

A housing 110 enclosing a space at the forward end of the camera 95 in which the light sensitive cell 70 and the diaphragm adjusting mechanism, previously described, are mounted, is provided with a transverse wall 111 against which a magazine 112 is held by a leafspring 113. The wall 111 is preferably provided with a raised portion 114 which is adapted to engage a similar raised portion 115 on the magazine 112 for accurately positioning the magazine 112 in the camera 95.

A mechanism plate 116 separating the motor mechanism from the magazine chamber is provided with two pins 117 and 118 which extend through slots 119 in a control member 120 and permit vertical adjustment of this member. The upper pin 117 is headed to prevent movement of the member 120 axially of the pin 117, but the lower pin 118, preferably, is not headed so as to allow a desirable spring action of the member 120 as will be described below. The upper end of the member 120 carries a pin 121 on which is pivoted a bell crank 122. One arm of the crank 122 carries a pin 123 extending between the prongs of a bifurcated ear 124 projecting from the grid shutter 71. The other arm of the crank 122 is rounded and extends into abutting engagement with a floating pin 125 which extends through the transverse wall 111 and is suitably mounted in any well known manner to permit limited lengthwise movement thereof. The magazine is provided with a facing which may take the form of an embossing 126 occupying a plane bearing a relation to the vertical plane containing the magazine locating embossing 115 which is a predetermined function of the sensitivity of the film contained in the magazine 112.

A spring 127 carried by the pivot pin 121 for the crank 122 tends to rotate the crank 122 in a counter clockwise direction and thereby biases the floating pin 125 to its extreme right position as viewed in Fig. 9. When the magazine 112 is inserted its facing 126 forces the pin 125 to the left to adjust the grid shutter 71 in accordance with sensitivity of the film in the magazine 112. It is thus seen that rotary movement of the crank 122 about the pin 121 adjusts the grid shutter 71 in accordance with the speed of the film. The manner in which vertical movement of the pivot pin 121 adjusts the shutter 71 in accordance with the camera speed, that is, the exposure time, will now be described.

Figure 11:
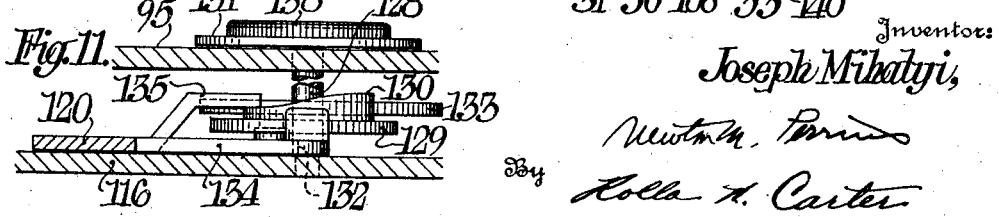
Fig. 11 is a detail in section of the speed control adjusting mechanism used in the camera shown in Figs. 9 and 10.

As is best shown in Fig. 11 a shaft 128 journaled in the mechanism plate 116 and the side wall of the camera 95 has secured thereto a radial cam 129 and an axial cam 130 which are manually adjustable by means of a dial 131 secured to the shaft 128 and constituting the change speed adjustment. The lower end 132 of the control member 120 bears against the governor disc 133 under the spring force of the member 120 above mentioned and is provided with two projecting fingers 134 and 135 which constitute followers for the cams 129 and 130, respectively, whereby upon rotation of the shaft 128 by means of the dial 131, the radial cam 129 imparts a vertical adjustment to the control member 120 and the axial cam 130 imparts a lateral adjustment to the finger 135 which adjusts the relation between the lower end 132 of the member 120 and the governor disc 133 to vary the speed of the camera mechanism in a well known manner. It will be noted that the governor disc is driven through a gear 136 by the gear 104 of the camera drive gear train.

Referring to Fig. 10, the shaft 98 is provided exteriorly of the camera 95 with a crank 137 for winding the spring motor of the camera in a customary manner. The speed change dial 131 may be provided with a knurled ring 138 to facilitate adjustment and is preferably calibrated in suitable units which cooperate with a stationary index mark 139 to indicate the speed setting of the apparatus. The camera operating button 33, as was fully described in connection with Figs. 1 and 2, for rotating the lever 30 about its pivot 31 extends outside the camera wall and is permitted its necessary movement by an accurate slot 140 provided in the camera wall. Downward movement of the button 33 and its lever 30 carries with it the bent over end 36 which causes entrapment of the meter pointer and subsequent adjustment of the camera diaphragm after which the lever 30 moves the pin 49 sufficiently to disengage a stop arm 141 from a notched cam 142 carried by the pull down operating shaft 106, thereby permitting operation of the camera drive mechanism.

While I have shown and described the camera diaphragm as being of a special type, it will be understood that this diaphragm may be of any suitable construction having a movable element for governing the transmission of light therethrough.

It will be evident from the above description that the mechanism of my invention does not detract from the portability of a camera and adds very little weight thereto. The specific structure and arrangement of parts as described are merely illustrative of my invention and the functions thereof may be performed in other ways as will readily occur to those skilled in this art.

While I have shown and described my invention as applied to a motion picture camera it is not limited thereto but may be applied to still cameras with equally improved results. Other modifications and arrangements may be made without departing from the spirit and scope of my invention as set forth in the appended claims.

What I claim as new and desire to secure by Letters Patent of the United States, is:—

1. In a motion picture camera in which a device including a light sensitive cell controls the opening to which the diaphragm of the camera may be adjusted, a grid shutter in front of the cell for varying the area of the cell exposed comprising two relatively movable elements having a plurality of parallel spaced elongated openings, a change speed lever for adjusting the speed of operation of the camera and means actuated by the movement of said lever for altering the relative positions of said movable elements.

2. In a motion picture camera, a diaphragm adjusting mechanism, an operating lever movement of which sequentially actuates the diaphragm adjusting mechanism and releases the camera mechanism to make a series of exposures, a stop member for determining the setting to which the diaphragm may be adjusted, a device including a light sensitive cell for governing the position of said stop member, means for holding said stop member in the position determined by said device, a member movable with said adjusting mechanism for engaging the stop member and means for altering the positional relation between said movable member and said adjusting mechanism.

3. A photographic camera having a diaphragm for governing the transmission of light to a film to be exposed and a camera release lever, a stop member adapted to be deflected to a position corresponding to the intensity of the light falling on the diaphragm, means adapted to be actuated by the movement of said lever for retaining the stop member in its deflected position, means under the control of said lever for progressively adjusting the setting of the diaphragm, means movable with the diaphragm adjusting means for engaging the stop member to discontinue the adjustment of the diaphragm, a mechanical linkage connecting said movable means and a movable part of the diaphragm and means for adjusting said linkage to alter the relative positions of said movable means and said movable part of the diaphragm whereby different diaphragm settings may be obtained with a given deflection of said stop member.

4. A motion picture camera having means for adjusting a diaphragm in accordance with the activation of a light sensitive cell carried by the camera and having a chamber adapted to receive a magazine provided on its outer surface with an embossing corresponding to the sensitivity of the film contained in the magazine, and means carried by the camera in a position to engage said embossing for varying the exposed area of said cell, whereby the diaphragm will be adjusted in accordance with the sensitivity of the film to be exposed therethrough.

5. A film camera, designed for use with an interchangeable film magazine having an embossing characteristic of the sensitivity of the film contained in the magazine, said camera including a diaphragm, a light sensitive device, a mechanism controlled by said device for adjusting the diaphragm, and a movable member for altering the operating characteristics of said mechanism, means carried by the camera and so positioned with reference to the embossing on the magazine that it is adapted to contact the embossing and be moved to a position corresponding to a characteristic of the embossing when said magazine is inserted in the camera, and an operative connection between said means and said movable member, whereby the insertion of the magazine will influence the diaphragm adjusting mechanism in accordance with the sensitivity of the film carried by the magazine.

6. A film camera, designed for use with an interchangeable film magazine having an embossing characteristic of the sensitivity of the film contained in the magazine, said camera including a diaphragm, a diaphragm adjusting mechanism comprising movable means for varying the area of the diaphragm opening and a light sensitive device cooperating with the movable means for determining the opening to which the diaphragm may be adjusted, a movable member for altering the operating characteristics of said mechanism, and means for positioning the magazine in the camera, said movable member being so positioned with reference to the magazine positioning means that it is adapted to contact and be moved in accordance with a characteristic of the embossing on the magazine when the magazine is positioned in the camera.

JOSEPH MIHALYI.